Aug. 27, 1957  F. L. COOK  2,803,852
AUTOMATIC MOULDING MACHINE
Filed Aug. 25, 1953  9 Sheets-Sheet 1

INVENTOR:
FREDERICK L. COOK
By Young, Emery & Thompson
Attys.

Aug. 27, 1957  F. L. COOK  2,803,852
AUTOMATIC MOULDING MACHINE
Filed Aug. 25, 1953  9 Sheets-Sheet 2

INVENTOR:
FREDERICK L. COOK
By: Young, Emery & Thompson
Attys.

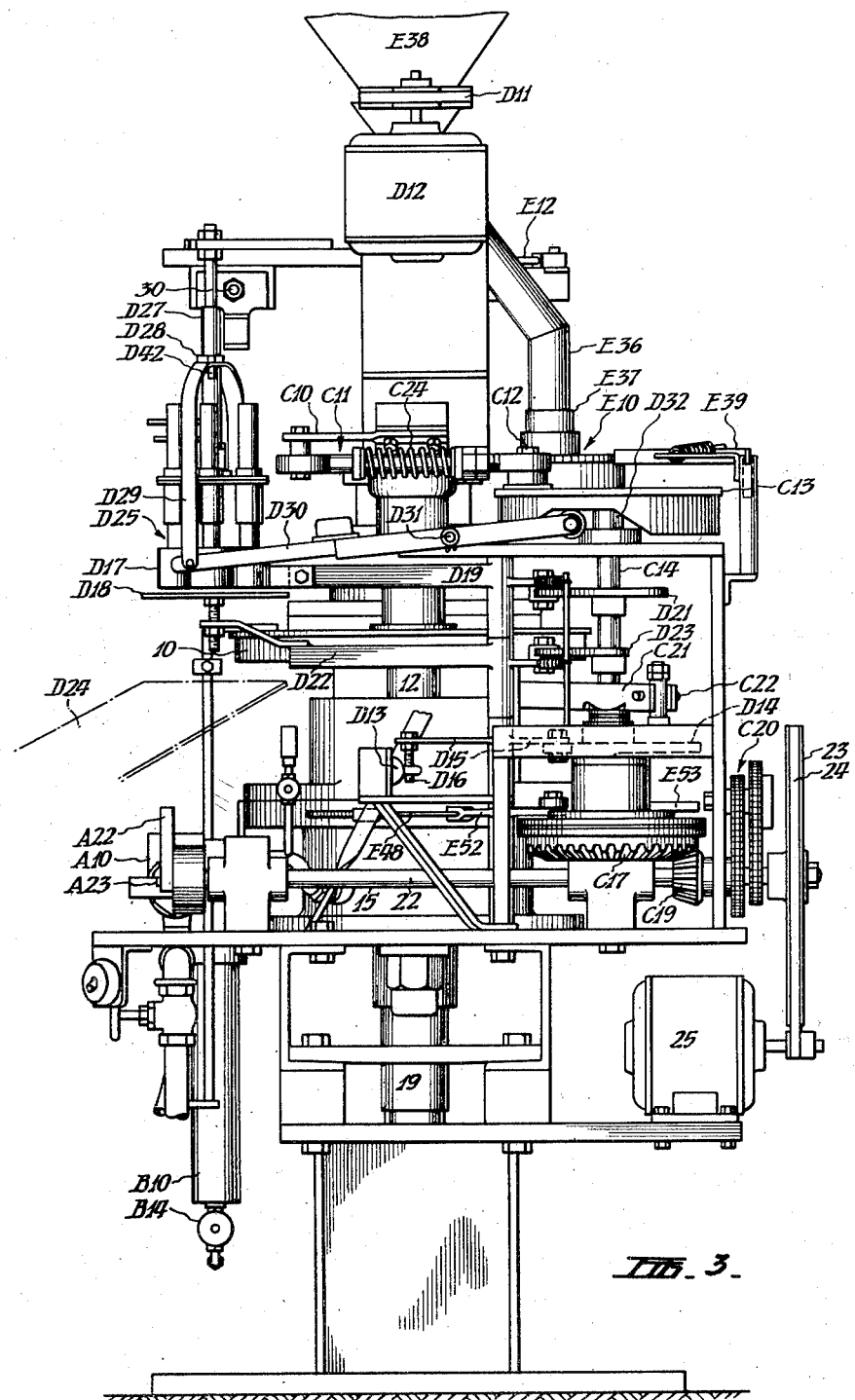

Aug. 27, 1957  F. L. COOK  2,803,852
AUTOMATIC MOULDING MACHINE
Filed Aug. 25, 1953  9 Sheets-Sheet 4
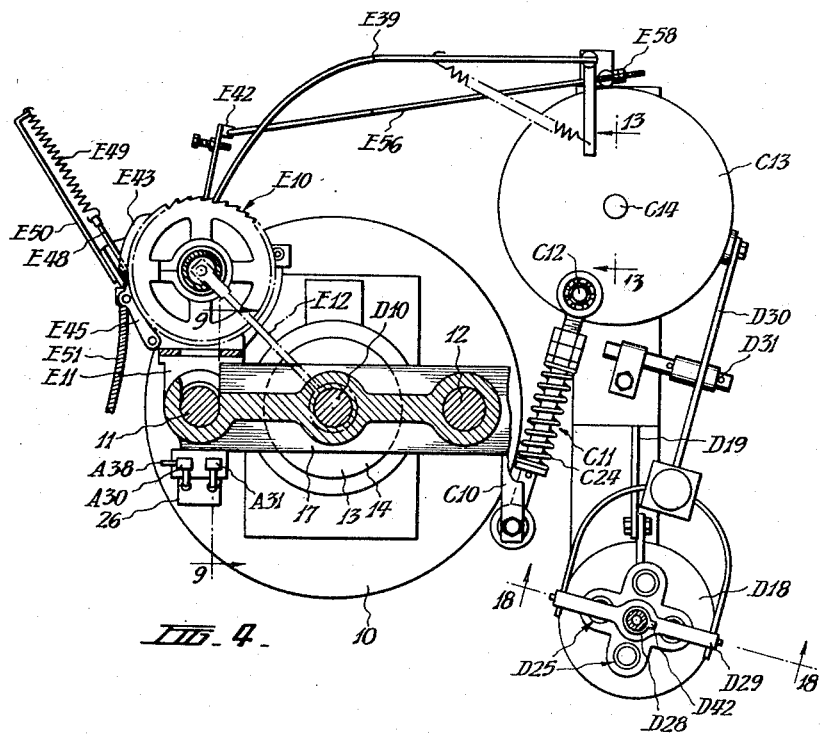
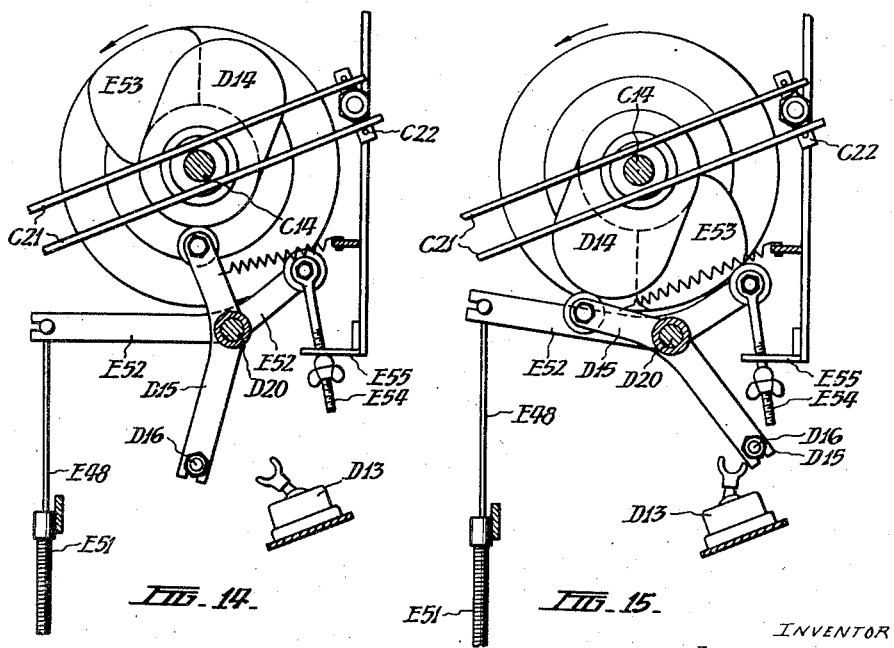
INVENTOR
FREDERICK L. COOK
By Young, Emery & Thompson
Attys.

Aug. 27, 1957   F. L. COOK   2,803,852
AUTOMATIC MOULDING MACHINE
Filed Aug. 25, 1953   9 Sheets-Sheet 5
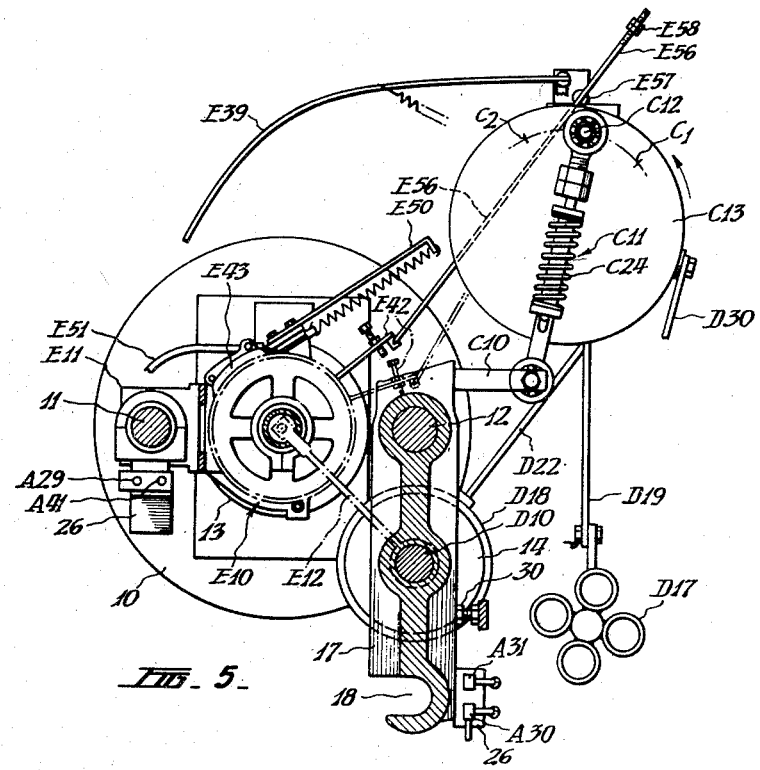
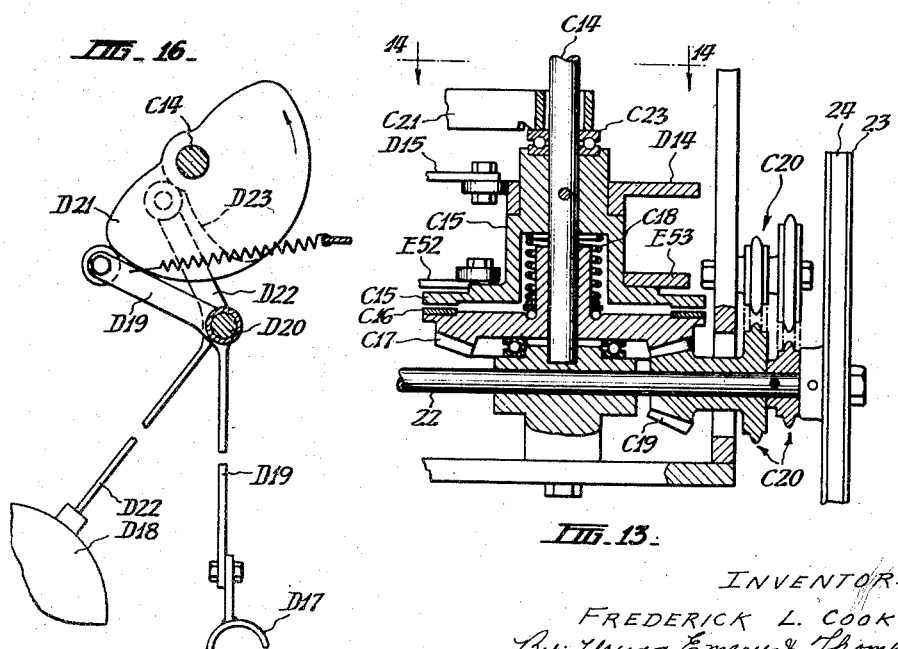
INVENTOR:
FREDERICK L. COOK
By Young, Emery & Thompson
Attys.

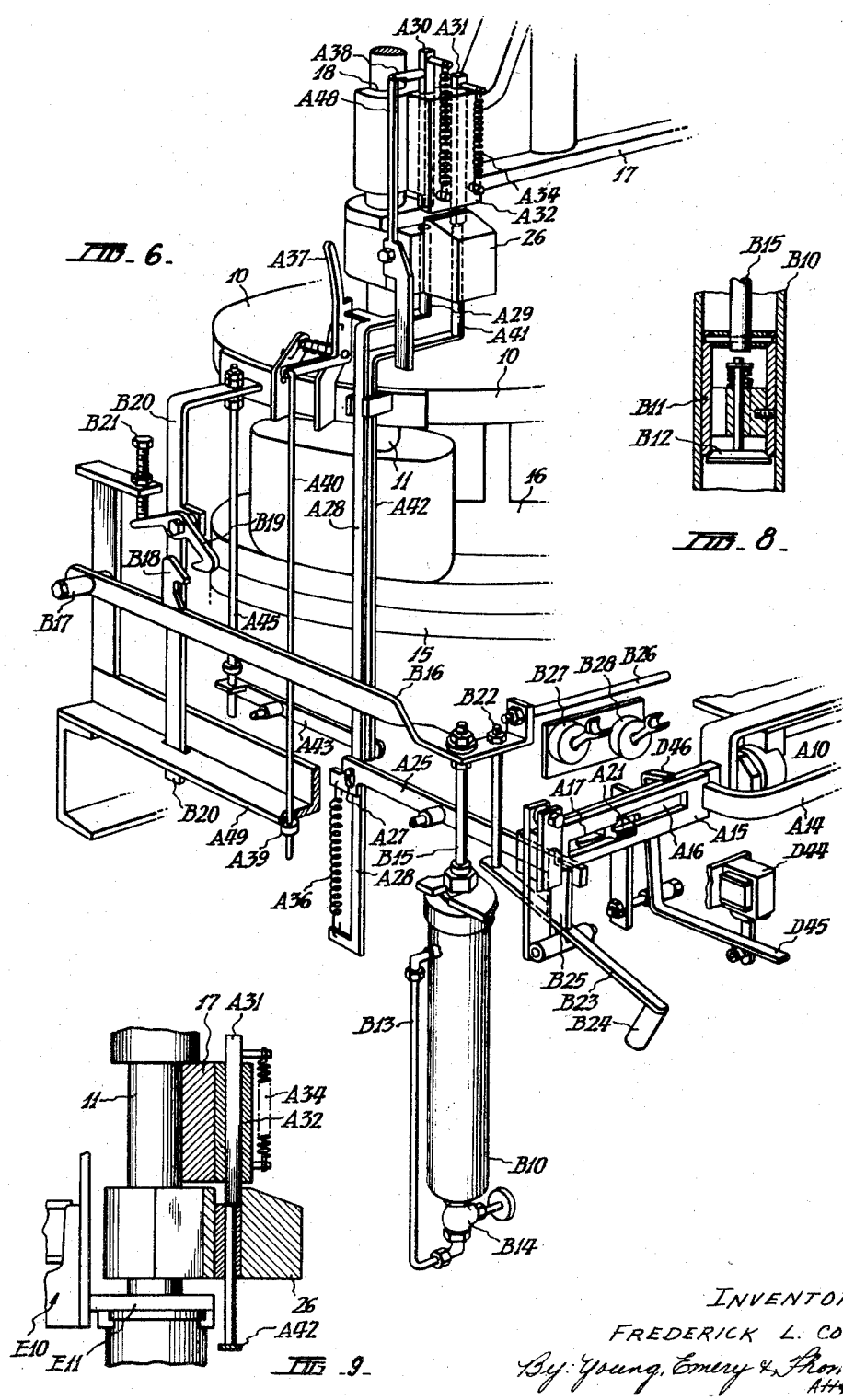

Aug. 27, 1957  F. L. COOK  2,803,852
AUTOMATIC MOULDING MACHINE
Filed Aug. 25, 1953  9 Sheets-Sheet 7
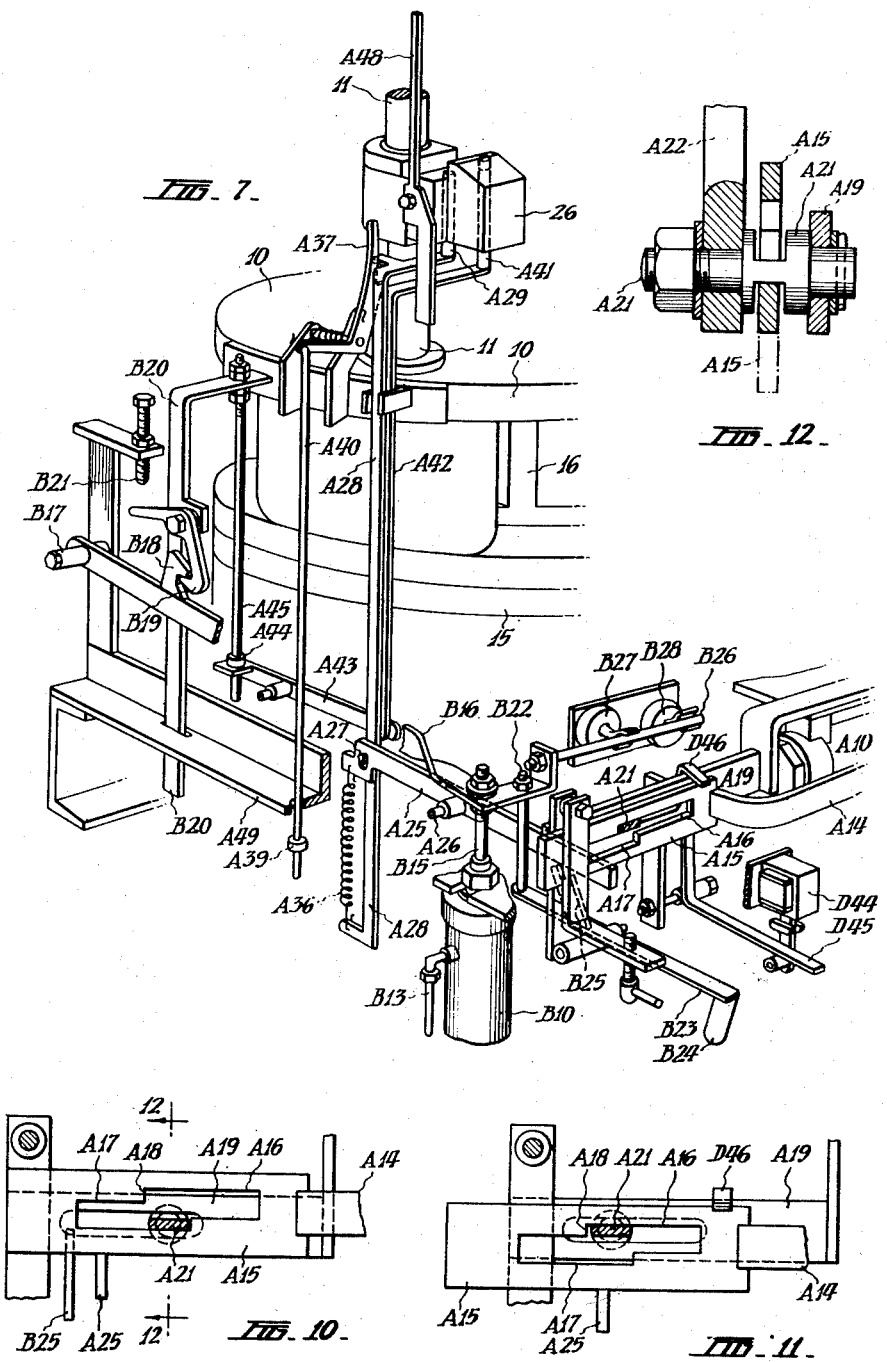
INVENTOR:
FREDERICK L. COOK
By Young, Emery & Thompson
Att'ys.

Aug. 27, 1957  F. L. COOK  2,803,852
AUTOMATIC MOULDING MACHINE
Filed Aug. 25, 1953  9 Sheets-Sheet 8

INVENTOR
FREDERICK L. COOK
By: Young, Emery & Thompson
ATTYS.

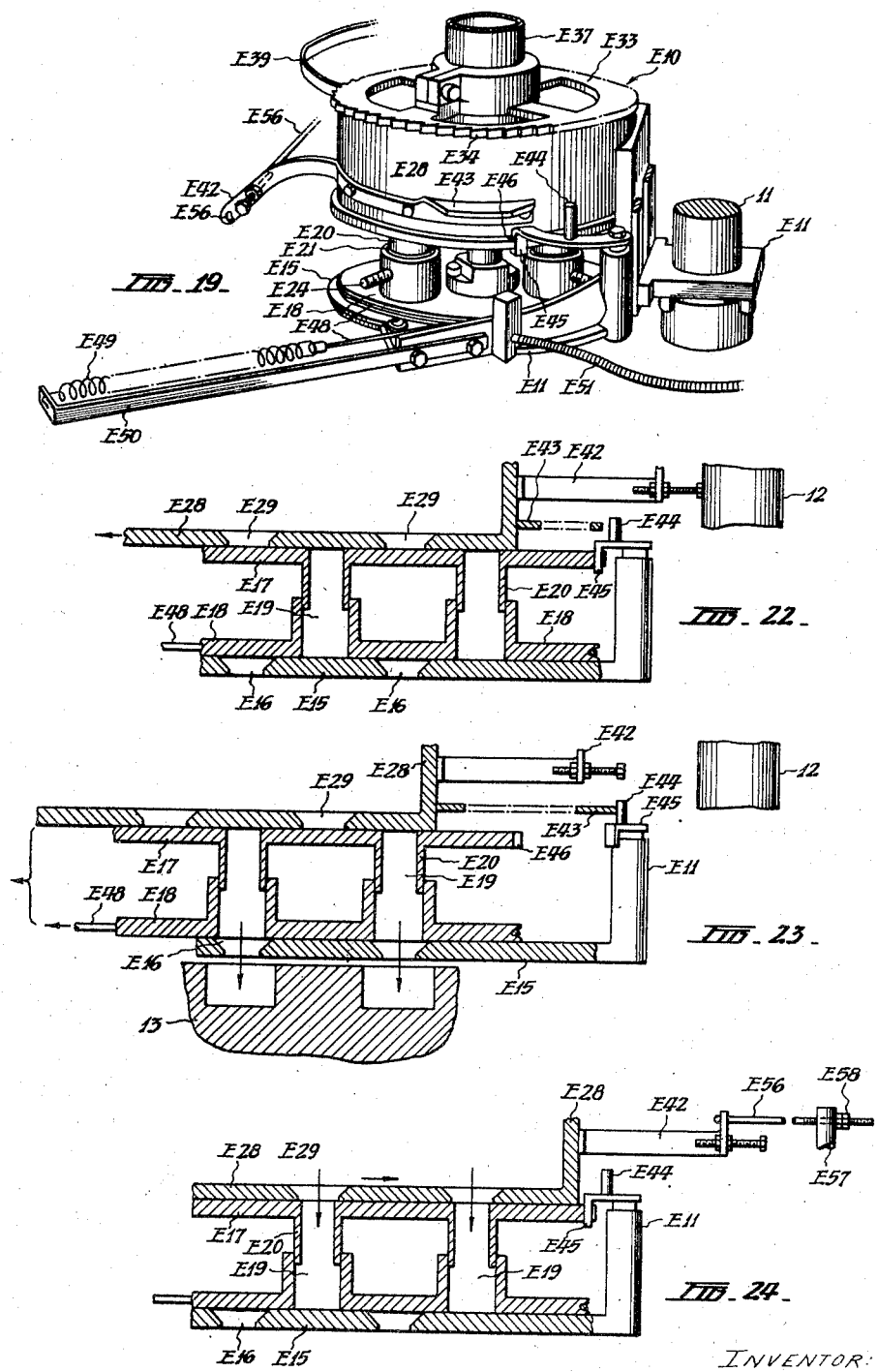

United States Patent Office                                    2,803,852
                                                           Patented Aug. 27, 1957

2,803,852

AUTOMATIC MOULDING MACHINE

Frederick Leonard Cook, Brighton, Victoria, Australia

Application August 25, 1953, Serial No. 376,470

Claims priority, application Australia October 22, 1952

14 Claims. (Cl. 18—16)

This invention relates to machines for moulding articles from plastic materials and refers especially but is not limited to compression moulding machines for thermosetting materials.

The object of the invention is to provide an improved fully automatic moulding machine capable of continuous operation at a relatively high production rate.

Accordingly, the invention broadly resides in an automatic moulding machine comprising two opposed platens adapted to support complementary mould members, actuating means for reciprocating one at least of said platens, thereby to open and close the mould, control means for said platen actuating means, means operable when the mould is closed to actuate said control means to effect the retraction of said movable platen, ejecting means for the moulded articles, means operable consequent upon the retraction of said movable platen to actuate said ejecting means, a movable mould charging means, means operable consequent upon the retraction of said movable platen to move said charging means into register with one of said mould members to deliver a charge of mouldable material thereto and then to retract said charging means and means operable consequent upon the retraction of said charging means to actuate the said control means to effect the projection of said movable platen and reclose the mould.

Preferably, said means to actuate said control means when the mould is closed, comprises a timing device operable to cause the mould to remain closed for a predetermined time. The said timing device preferably comprises a dashpot arranged to be reset by the movement of said movable platen during the mould closing operation thereof and includes trip means operable to release said dashpot as the mould closely approaches the fully closed condition.

The said control means preferably includes two reciprocable members comprising a gate member and a slider operable therein, said gate member being formed with two elongated slots disposed parallel to each other and spaced apart both longitudinally and laterally with their inner ends overlapping and communicating, the said slider being operable alternatively within the slots, a platen reversing means movable in opposite directions whereby projecting and retracting movemets are imparted to said movable platen, means connecting one of said reciprocable members to said platen reversing means, means operable to reciprocate the other said member in the direction lengthwise of said slots and means operable to impart transverse movements to one of said reciprocable members to transfer said slider from either of said slots to the other slot.

The machine also preferably includes locking means operable to secure said charging means or other movable member in the position occupied thereby when the mould is closed and means operable by said locking means are preferably provided to prevent the projection of the movable platen to close the mould until said movable member is locked in its said position.

The said machine also preferably includes means for temporarily supporting each moulded article following the ejection thereof from the mould, means for detecting each article when thus ejected and supported, means operable by said detecting means, consequent upon the detection of an article thereby, to permit of a further projecting movement of said movable platen and means operable prior to the ejection of each moulded article to discharge from said supporting means the article formed during the preceding operation of the machine.

A further feature of the invention resides in the provision of means for stopping the operation of the machine if the movable platen after being retracted does not commence a further projecting movement within a predetermined time, such means being preferably operable by the aforesaid timing means.

The said charging means is supported for bodily movements from a normally retracted inoperative position to its projected and operative position, in which it registers, with the coacting mould member and the charging means preferably comprises a lower member formed with an aperture for the discharge of mouldable material into the coacting mould member, an intermediate member movably supported on said lower member and formed with a measuring compartment normally disposed out of register with said aperture in the lower member, a container for mouldable material movably supported above said intermediate member and formed with a discharge aperture which is movable into and out of register with the upper end of said measuring compartment and means operable when said charging means moves into register with the coacting mould member to impart a relative movement to said lower and intermediate members whereby the measuring compartment registers with and discharges it contents through the discharge aperture in the lower member.

Preferably the said intermediate member and container are supported for angular movements on the lower member as hereafter described.

The said machine also preferably includes a rotatable spindle operable to actuate said mould charging means and said detecting means for the ejected articles and motion is preferably transmitted to said spindle through a clutch which is operable by said movable platen in such a manner that the clutch is engaged only when said movable platen is retracted.

A known type of manually controlled compression moulding machine includes an abutment platen for supporting an upper mould member above and in coaxial alignment with a lower mould member on a vertically movable lower platen operable by a hydraulic ram, the said abutment platen being in the form of a pivoted crosshead whereby it may swing laterally to facilitate the ejection of the moulded articles and the supply of mouldable material to the lower mould member. The present invention may advantageously be applied to a machine of this type, for which purpose means, operable consequent upon the retraction of the lower platen, are provided for actuating the said cross-head, and the said charging means is preferably connected to the cross-head in order to move in unison therewith.

Preferably the automatic control and power actuating mechanism is constructed and arranged so as to be adapted for the conversion of manually controlled machines for automatic operation as hereafter described.

In the following description of one preferred construction of moulding machine embodying the invention, reference is made to the accompanying drawings, in which:

Figure 3 is a view in side elevation from the right-hand side of Figure 2,

Figure 2:
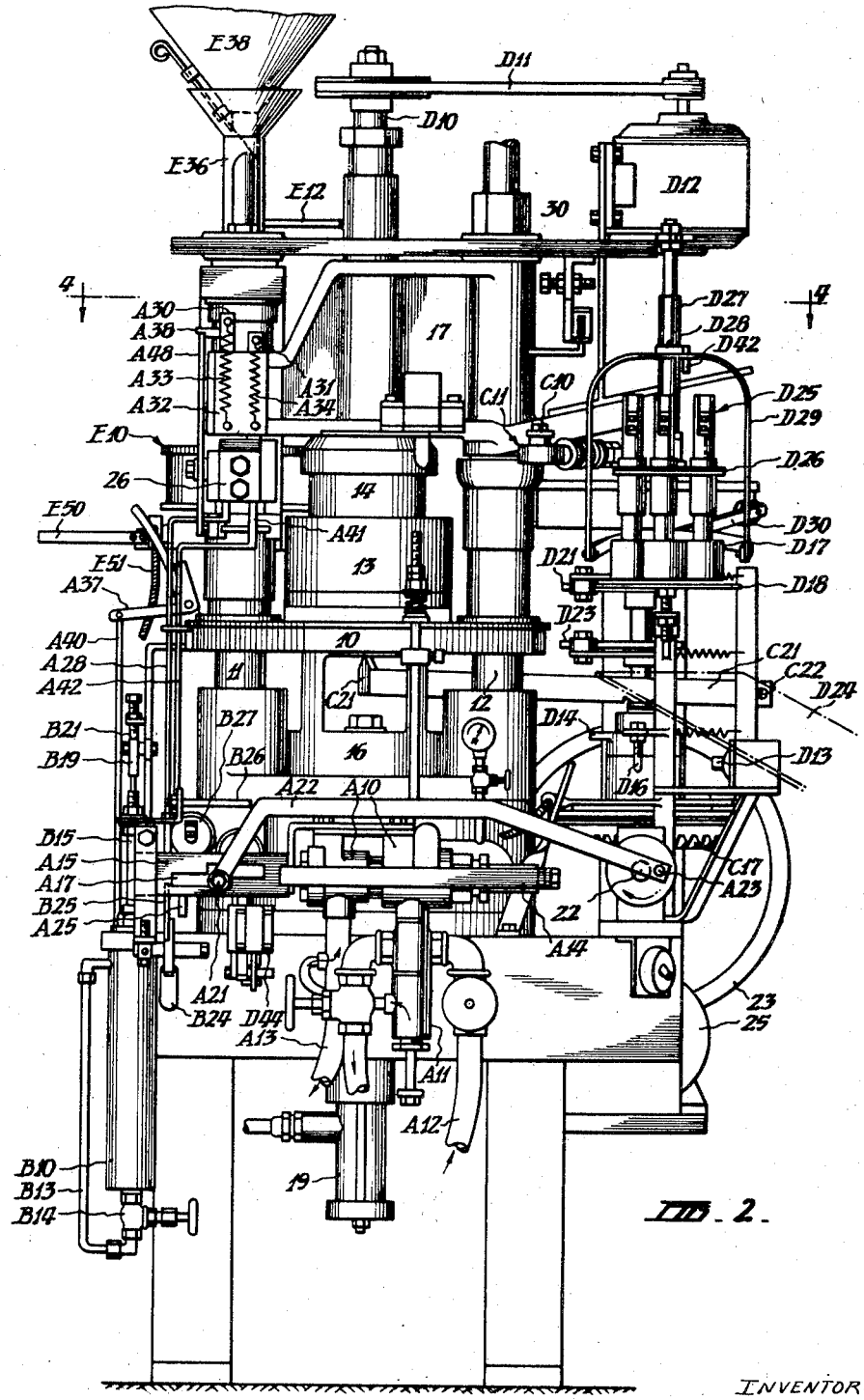
Figure 2 is a view in front elevation of an automatic machine embodying the invention, for moulding articles from thermosetting materials.
Figure 20:
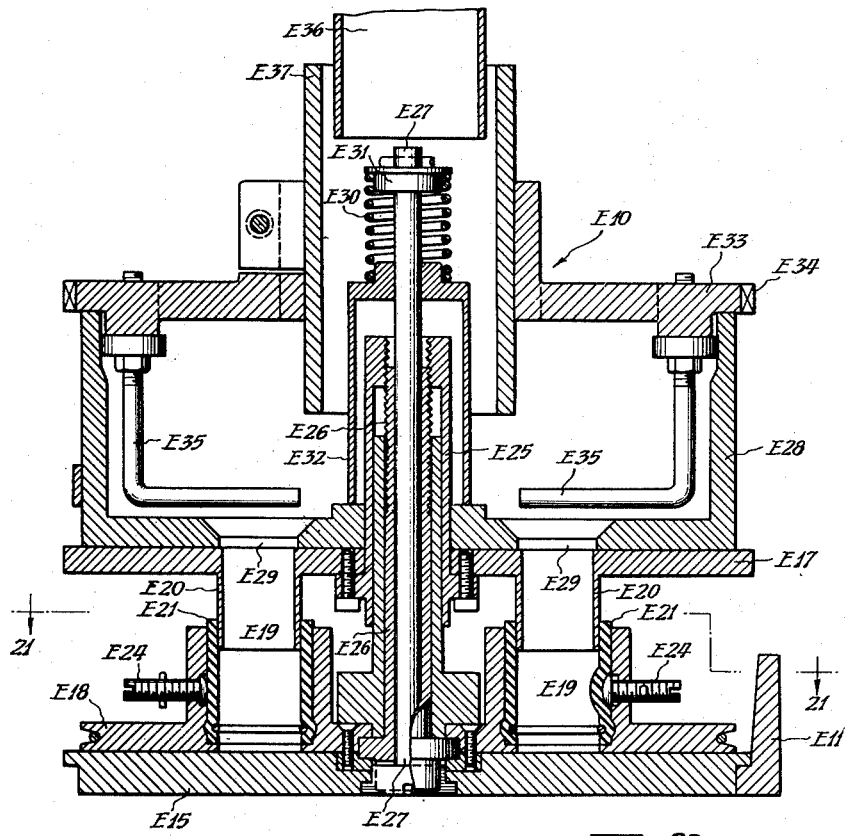
Figure 21:
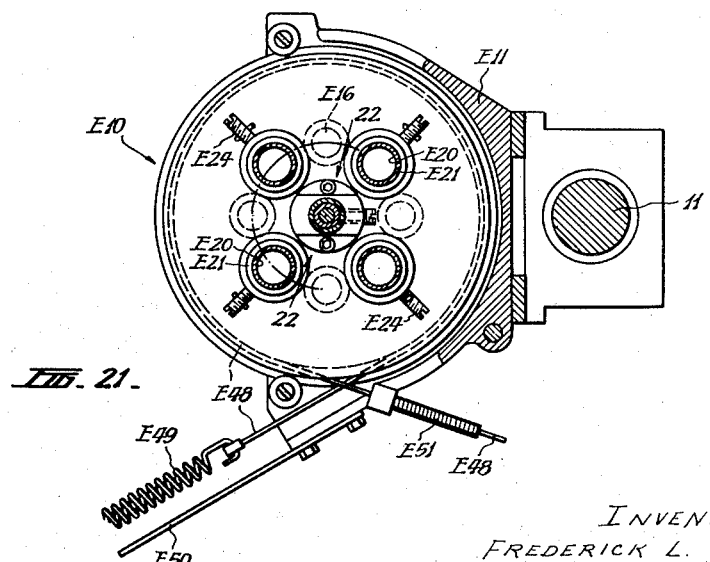

Figure 4 is a view in sectional plan taken approximately on the line 4—4 of Figure 2 and is simplified by the omission of certain parts of the apparatus, Figure 5 is a view similar to Figure 4 and shows another stage of the operation of the machine, Figure 6 is a perspective view of certain control mechanism located at the front and left-hand side of the machine when viewed as in Figure 2, Figure 7 is a view similar to Figure 6 and shows another stage in the operation of the machine, Figure 8 is a view in sectional elevation of a dashpot plunger, Figure 9 is a view in vertical section of a locking device, the section being taken in the plane designated 9—9 in Figure 4, Figure 10 is a view in sectional elevation of a gate plate and associated parts, Figure 11 is a view similar to Figure 10 and shows another stage in the operation of the machine, Figure 12 is a view in sectional elevation taken on the line 12—12 of Figure 10, Figure 13 is a view in sectional elevation taken on the line 13—13 of Figure 4, and shows an actuating spindle and associated mechanism, Figure 14 is a view in sectional plan taken on the line 14—14 of Figure 13, Figure 15 is a view similar to Figure 14 and shows another stage in the operation of the machine, Figure 16 is a view in sectional plan of additional cams on the vertical spindle shown in Figures 13, 14 and 15, Figure 17 is a longitudinal section of an extensible connecting rod, Figure 18 is a view in sectional elevation taken on the line 18—18 of Figure 4, of detecting means for the ejected moulded articles, Figure 19 is a perspective view of a mould charging device, Figure 20 is a view in vertical section of the mould charging device, Figure 21 is a view in sectional plan taken on the line 21—21 of Figure 20, and Figures 22, 23 and 24 are developed sectional views of diagrammatic nature showing different stages in the operation of the charging device.

Figure 1:
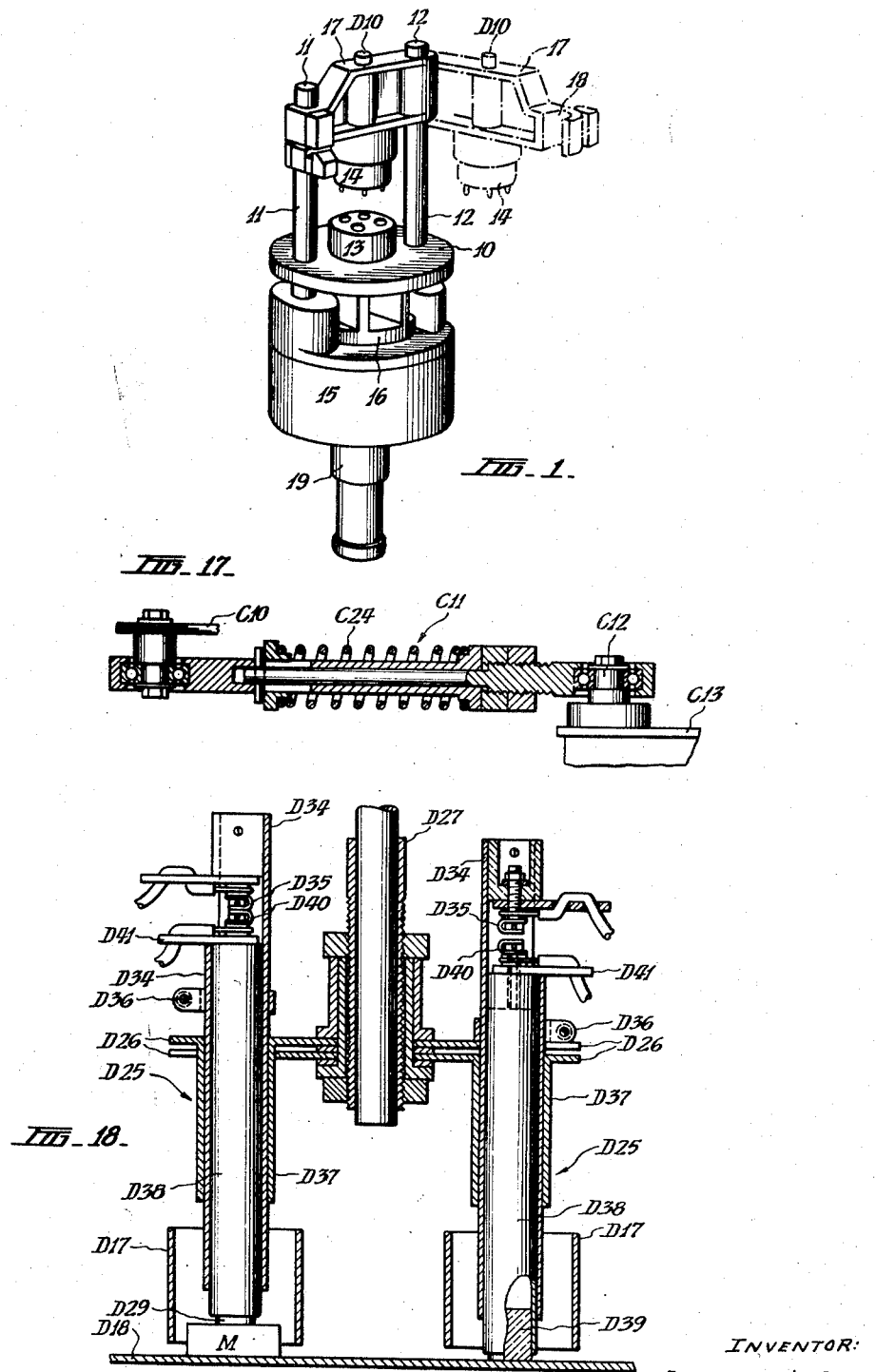
Figure 1 is a simplified perspective view of a known type of manually controlled moulding machine.

Figures 2 to 24 inclusive illustrate the invention as applied to the aforesaid known type of manually controlled moulding machine which latter is illustrated in simplified form in Figure 1. This manually operated machine comprises a hydraulic ram for a horizontal platen 10 which is movable vertically on a pair of fixed guide posts 11 and 12 whereby a lower female mould 13 supported on the platen is moved into and out of engagement with a coacting upper male mould 14. The posts 11 and 12 are secured at their lower ends to the cylinder 15 of the hydraulic ram and the platen 10 is secured to the upper end of the ram 16 therein.

The upper mould member 14 is secured to the lower surface of an abutment platen or cross-head 17 one end of which is pivotally mounted on the post 12, while the other end of the cross-head is formed with a vertical slot 18 to accommodate the other post 11 at which time the upper mould 14 is in register with the lower mould, means (not shown) being provided for locking the cross-head in that position.

The cross-head is restrained against vertical movements by collars or the like on the posts 11 and 12 but is free to be swung forwardly as shown in broken lines in Figure 1, so as to facilitate the removal of the moulded articles from the upper mould 14 to which they remain attached and also to facilitate the manual recharging with moulding powder or pellets of the cavities in the lower mould member 13.

A drawback ram housed within a hydraulic cylinder 19 of relatively small diameter is usually provided for retracting the lower platen, and this drawback ram may be continuously urged downwards by hydraulic pressure.

Now the present invention relates to a fully automatic moulding machine capable of continuous operation and is hereafter described as applied to a machine of the kind shown in Figure 1, though it is not limited thereto and the illustrated mechanism has been devised so as to permit of the conversion of the said manually controlled machines to automatic machines.

For this purpose the automatic machine shown in Figures 2 to 5 inclusive may be regarded as comprising a machine as shown in Figure 1 with the addition of:

A. Mechanism for actuating the main hydraulic valve for the main hydraulic ram to raise and lower the lower platen.

B. Timing mechanism for causing the mould to remain closed for the time necessary to "cure" the moulded articles.

C Actuating mechanism for the pivoted cross-head.

D. Mechanism for ejecting the moulded articles such ejecting mechanism being associated with protective mechanism.

E. Charging mechanism for supplying mouldable material to the mould cavities.

These several added mechanisms are of course interconnected so as to operate in timed relation and in predetermined order.

In order to facilitate the identification of the various parts in the drawings, such parts are, where it is practicable to do so, designated by a numeral prefixed by one of the foregoing letters A, B, C, D and E to indicate the component mechanism in which it is embodied.

*Main hydraulic valve and actuating mechanism therefor*

The main hydraulic valve A10 (Figures 2, 3, 6 and 7) is arranged horizontally at the front of the machine and includes a slidable spindle which is moved to the right in order to connect the main ram cylinder 15 to a pipe A12 for supplying oil or other liquid under pressure thereto. When the valve spindle is moved to the left, the said cylinder is connected to a return pipe A13 and is shut off from the supply pipe, so that the main ram and platen are forced downwards by the drawback ram in the cylinder 19, the upper end of which is permanently connected to the supply pipe A12.

Preferably a throttle valve A11 controlled by the platen 10 is provided for reducing the upward speed of the platen as the mould closely approaches the closed condition. Suitable means for this purpose are known and do not form a part of this invention.

A substantially horizontal arm A14 (Figures 2, 6, 7, 10 and 11) pivotally connected about a transverse axis to the outer end of the slidable valve spindle has its free end secured rigidly to the adjacent end of a gate plate A15 which is arranged on edge and is capable of a limited vertical movement.

This gate plate is formed with two horizontal slots A16 and A17 of equal length arranged one above the other with their inner ends overlapping and intersecting as best shown in Figures 10 and 11 whereby said slots are connected by a vertical slot A18. Thus as shown in the drawings the upper slot A16 is disposed adjacent to the inner or right-hand end of the gate plate while the lower slot A17 is disposed adjacent to the outer or left-hand end of the plate.

A fixed guide plate A19 arranged on edge behind the gate plate is formed with a horizontal guide slot A20 for a slider A21. This slider has a flat-sided neck portion which extends through one of the slots A16 and A17 in the gate plate, while its forward end is connected by a connecting rod A22 to a crankpin A23 on the forward end of a horizontal spindle 22 supported in bearings at the right-hand side of the machine (Figures 2 and 3).

The rear end of the spindle 22 is fitted with a pulley 23 which is connected by a belt 24 to a pulley on an electric motor 25 which also drives certain other parts of the machine as hereafter explained.

This motor is switched on and off at appropriate intervals as hereafter described and it will be evident that when it is operating, the slider A21 reciprocates continuously in the slot in the fixed guide plate A19.

Each of slots A16 and A17 in the gate plate A15 is just sufficiently long to enable the slider A21 to reciprocate therein without displacing the gate plate.

Thus when the gate plate is retained in its raised position as shown in Figures 2, 6 and 10 the slider operates freely in the lower slot A17 in the gate plate and the latter is disposed in its right-hand position in which the main valve A10 is closed.

When, however, the gate plate is released as hereafter explained, it will descend under its own weight when the slider A21 is disposed at the inner end of its stroke, so that during its next outward stroke, the slider pushes the gate plate to the left and thereafter operates freely in the upper slot A16 therein as shown in Figures 7 and 11. This movement of the gate plate is transmitted by the arm A14 to the main valve A10 so that the latter is operated as previously explained to disconnect the supply pipe A12 from the ram cylinder 15 and simultaneously connect the latter to the return pipe A13 whereby the lower mould member 13 commences its downward stroke.

Similarly, when the gate plate is subsequently restored to its raised position, the slider enters the inner end of the lower slot A17 therein and returns the latter and the valve spindle to their respective right-hand positions whereby the main ram commences an upward stroke.

The gate plate A15 is raised by means of a rocker arm A25 (Figures 6 and 7) pivoted at A26 to the frame of the machine and having its forward end extending below the gate plate. The rear end of the rocker arm has a lost motion connection A27 with a vertical push rod A28 which is bent inwardly at its upper end and is secured to the lower end of a rod A29 which extends slidably through a latching member 26 secured to the guide post 11 immediately below the free end of the pivoted cross-head 17 (see also Figure 9). This latching member is formed with a rearwardly facing vertical retaining shoulder for engagement by two vertically slidable locking bolts A30 and A31 mounted in a bracket A32 secured to the free end of the cross-head.

The locking bolts are urged downwardly by springs A33 and A34 whereby they occupy their lowermost positions when the cross-head is swung forwardly but as the latter returns to its operative position, the lower ends of these bolts engage an inclined ramp formed on the top of the latching member 26 and are raised thereby in opposition to their associated springs.

As the bolt A30 passes from the ramp and behind the retaining shoulder, it is forced downwardly by its spring A33. At this time this bolt is in register with the rod A29 so that the latter is depressed together with the push rod A28.

This downward movement of the push rod tends to depress the rear end of the rocker arm A25 and to raise the forward end thereof so as to lift the gate plate A15 but as previously explained, the latter is incapable of such movement unless the slider A21 is in register with the overlapping ends of the slots A16 and A17.

If therefore the slider is disposed out of register at this time, the lost motion connection A27 enables the push rod A28 to move independently of the rocker arm A25 at the same time extending a connecting spring A36 which thus actuates the rocker arm to lift the gate plate when the slider A21 is subsequently moved into register with the communicating inner ends of the slots A16 and A17.

It will be evident therefore that the gate plate A15 cannot be raised to connect the main hydraulic cylinder 15 to the supply pipe A12, until the pivoted cross-head 17 is locked in its operative position by the locking bolt A30.

When the gate plate is raised as described, it is automatically retained in that position until the conclusion of a timed interval as hereafter explained.

Referring still to Figures 6 and 7, a spring-loaded bell crank lever A37 pivotally supported on the lower platen 10 has an upwardly extending arm formed with a shoulder which engages a laterally projecting lug on the push rod A28 as the lower platen 10 is moving upwardly. Thus this push rod is again raised to lift the locking bolt A30 to its inoperative position shown in Figure 6 and when it is raised to its full extent, a lateral projection A38 on the bolt passes above the upper end of a retaining lever A48 which is weighted at its lower end and is pivoted intermediate its ends to the latching member 26. Thus the upper end of this retaining lever swings forwardly below the lateral projection A38 on the bolt A30 to retain the latter in its dis-engaged position in preparation for the next outward movement of the cross-head 17.

At this time, however, the cross-head is locked in its operative position by the other locking bolt A31 as hereafter explained.

After the locking bolt A30 has been released and before the lower platen 10 completes its upward movement, an adjustable collar A39 on the lower end of a rod A40 which depends from the horizontal arm of the bell crank A37 engages a fixed bar A49 so that during the final stage of the upward movement of the plate, the bell crank is moved in opposition to its associated spring to disengage the push rod A28.

It is not necessary to release the pushrod A28 before the platen 10 descends and the said release means comprising the bell crank lever A37 and adjustable stop A39 on the rod A40 is merely a convenient device for compensating for variations in the height of different moulds 13. Thus if desired, the push rod A28 may be raised by a vertically adjustable member on the platen 10.

When the cross-head is disposed in its inward or moulding position, the second locking bolt A31 is disposed in register with a vertical rod A41 which is slidably mounted in the latching member 26 and which is secured at its lower end to the upper end of a further push rod A42. The lower end of this push rod A42 is pivoted to one end of a rocker lever A43, the opposite end of which is engaged and depressed as the platen 10 is closely approaching the limit of its downward movement, by a collar A44 on a depending vertical rod A45 secured to the platen. This movement of the rocker lever A43 raises the push rod A42 to disengage the locking bolt A31.

As the locking bolt A30 was previously latched in its disengaged position, the cross-head is then free to be swung forwardly to discharge the moulded articles.

It has previously been explained that when the cross-head is subsequently returned to its operative position, it is immediately locked therein by the bolt A30 and from the preceding description it will be apparent that the bolt A31 cannot engage the latching member 26 at this time, because as the platen 10 is necessarily disposed in its lowermost position, the push rod A42 is held in its raised position by the engagement between the rocker lever A43 and the collar A44. Shortly after the platen commences to move upwardly, however, the rocker lever A43 is disengaged by the collar A44 so that the locking bolt A31 is moved downwards by its spring to engage the latching member 26 before the latter is disengaged by the bolt A30 in the manner previously explained.

Timing mechanism

This mechanism ensures that the mould remains closed for the time necessary for the curing of articles moulded from thermosetting material, that is to say, for the conversion of the articles to the infusible condition. Various known types of timing devices may be used for this purpose and one suitable type which is illustrated in the drawings comprises a hydraulic dashpot (Figures 6 and 7) having a vertical cylinder B10 fitted in the known manner with a slidable plunger B11 (Figure 8) incorporating a valve B12 which opens automatically as the plunger is raised to allow oil to pass through the plunger from the upper to the lower end of the cylinder. When the plunger completes its upward movement, however, the valve closes so that the liquid may return from the lower to the upper end of the cylinder only through a pipe B13 and the rate of flow through the latter is capable of accurate regulation by a valve B14.

The plunger B11 is secured to the lower end of a plunger rod B15 having its upper end connected to the free forward end of an arm B16 which is pivoted to a fixed support at B17.

This arm is provided intermediate its ends with an upward hook-shaped projection B18 which coacts with a hook B19 pivoted to a vertical bar B20 which is secured at its upper end to the platen 10 so that it moves in unison therewith.

As the platen approaches its fully retracted or lowermost position, the pivoted hook B19 engages the projection B18 so that when the platen undergoes each upward movement, the arm B16 and the dashpot plunger B11 are raised in unison therewith (Figure 7).

However, shortly before the platen completes its upward movement, a tail on the pivoted hook B19 engages an adjustable fixed stop B21 whereby the lever is displaced to disengage the coacting projection on the arm B16 (Figure 6).

When the arm B16 is thus released, the dashpot plunger commences to descend within its cylinder as previously described.

A vertical rod B22 which depends from a lateral projection on the free end of the arm B16 is disposed in alignment with the rear end of a rocker arm B23 which is pivoted to a fixed support and has a weight B24 secured to its opposite or forward end. This weighted rocker arm carries an upwardly extending retaining arm B25 for the gate plate A15, this retaining arm being formed with a notch to provide a supporting shoulder for the said gate plate.

As previously explained, the gate plate is disposed in its raised position, while the platen 10 is ascending and thus during the initial stage of this movement, the rod B22 is disengaged from the rear end of the rocker arm B23, so that the forward end of the latter descends under the influence of the weight B24 thereby moving the shoulder of the retaining arm B25 forwardly below the raised gate plate to prevent the descent of the latter. Thus when the rocker arm A25 which serves to lift the gate plate, is subsequently released, the latter is retained in its raised position by the retaining arm B25. Consequently, the gate plate is not displaced when the rocker arm B23 is released if due to the overrunning of the driving motor 25, the slider A21 is still reciprocating.

It will be evident, however, that when the dashpot plunger is returning to its lowermost position, it depresses the rear end of the rocker arm B23 whereby the retaining arm B25 is disengaged from the gate plate A15, the latter being then free to descend when the slider A21 moves into register with the connected ends of the slots A16 and A17.

A switch actuating bar B26 projects laterally from the free end of the pivoted arm B16 to coact with the tumblers of two switches B27 and B28 arranged adjacent to the path of movement thereof, and secured to a suitable fixed support, the switch B27 being arranged at a somewhat higher position than switch B28. The tumbler of each switch has a forked outer end for engagement by the actuating bar B26 as the latter approaches the respective switch.

The switch B28 is a protective limit switch which is operated to interrupt the power supply to the machine if the dashpot plunger should overrun its normal lowermost position, while the motor 25 is switched on and off at the appropriate stages of each cycle by means of the switch B27.

Thus when the platen 10 is fully raised as shown in Figure 6, whereby the mould is closed, the switch B27 is in the "off" position and the actuating bar B26 is disposed above the switch. When, however, the dashpot plunger B11 is subsequently approaching the lower end of its stroke, the actuating bar B26 engages the tumbler of switch B27 and moves same to the "on" position as shown in Figure 7. The driving motor 25 is thus started up, as a result of which the gate plate A15 is immediately moved to the left and the main ram and platen 10 commence to descend.

While it is convenient to utilise the same timing device in the manner previously described, to operate the limit switch B28 to shut down the machine if the platen 10 after reaching its lowermost position does not commence to ascend within a predetermined time, it will be evident that this is not essential as a separate timing device could be used if desired for that purpose.

When the platen is disposed in its lowermost or fully retracted position, the cross-head 17 is swung forwardly to discharge the moulded articles and the cavities in the lower mould 13 are recharged with moulding powder after which the cross-head is returned to its operative position, all as hereafter described.

When these operations are completed and the cross-head is locked to the post 11 by the locking bolt A30, the main valve is again operated to cause the main ram and the platen to ascend as previously described and during the initial part of this movement, the switch actuating bar B26 again engages the tumbler of the switch B27 and moves same to the "off" position to stop the operation of the main motor 25.

Thus the motor is operated only while the platen 10 is disposed at and close to its lowermost or fully retracted position.

It should be understood that the dashpot plunger B11 continues to descend until the platen commences its next succeeding upward movement, so that if for any reason such upward movement does not commence within a predetermined interval of time, the bar B26 operates the limit switch B28 and so causes the machine to stop.

In lieu of starting and stopping the motor 25 during each cycle of operations as described, this motor may be operated continuously in which case the slider A21 is reciprocated continuously. For this purpose, the switch B27 is omitted and the depending pin B22 on the lever B16 of the timing device is preferably adjustable in length so that it operates the rocker arm B23 to disengage the retaining arm B25 for the gate plate A15 as the platen 10 reaches the lower end of its stroke.

Thus in such circumstances the release of the gate plate is utilised, instead of the starting of the motor 25, to cause the relevant operation of the main valve A10.

*Cross-head actuating mechanism*

The pivoted end of the cross-head 17 is provided with a forwardly extending arm C10, the free end of which is connected by a resiliently extensible connecting rod, generally designated C11, to a crank pin C12 on a disc C13, secured to the upper end of a vertical spindle C14 (Figures 3, 4, 5, 13 and 14).

A disc C15 (Figure 13) is secured to the lower end portion of the spindle C14 with the marginal portion of its lower face arranged above and close to a friction ring C16 on the upper surface of a bevel gear C17 which is freely rotatable on the spindle.

A compression spring C18 is interposed between the bevel gear and the disc C15 so that the latter is normally disengaged from the friction ring C16.

When, however, the disc C15 is pressed downwards as hereafter described until it engages the friction ring, motion is transmitted from the bevel gear C17 to the spindle C14, so that the coacting parts form a friction clutch.

The bevel gear C17 is in constant mesh with a pinion C19 which is freely mounted on the spindle 22 and is connected thereto by chain and sprocket reduction gearing generally designated C20.

Thus when the main motor 25 is operating, the bevel gear C17 is rotated in unison with, but at a lower speed than, the spindle 22 but the vertical spindle C14 is not operated until the aforesaid friction clutch is engaged.

The clutch is operated by a lever C21 (Figures 2 and 13), the outer end of which is pivoted at C22 to a fixed support and which extends inwardly therefrom above the disc C15 on the spindle C14 and has its free inner end located centrally below the lower platen 10, a ball race C23 being interposed between the lever and the said disc C15 as shown in Figure 13.

As the platen 10 is closely approaching the lower end of its stroke, it thus engages the free end of, and depresses, the clutch actuating lever C21, so as to force the disc C15 downwardly in opposition to the spring C18 until it engages the friction ring C16 on the bevel gear C15, whereby the vertical spindle C14 is then driven in unison therewith.

The spindle C14 continues to rotate until it completes one revolution as hereafter described, and this rotation may take place only while the platen 10 is disposed at and near the lower end of its stroke.

Referring now to Figure 4, it will be clear that when the platen 10 is fully retracted and the spindle C14 commences to rotate in the direction of the arrow shown therein, the connecting rod C11 imparts an anti-clockwise or opening movement to the cross-head 17 and this movement continues until the latter reaches the position shown in Figure 5 and at which it engages a fixed stop 30.

When the cross-head reaches its said limiting position, the crank pin C12 is disposed in the position designated C1 in Figure 5. Thus the cross-head remains stationary, while the crank pin is moving from the position C1 to the position designated C2 and during this movement the connecting rod is necessarily extended by compressing a compression spring C24 incorporated therein. The construction of this extensible connecting rod is shown in detail in Figure 17.

Accordingly, the cross-head 17 remains stationary in its outermost position, while the crank pin is passing from C1 to C2 to permit of the ejection of the moulded articles from the upper mould member 14 as hereafter explained.

As the crank pin passes the point C2, the connecting rod C11 commences to move the cross-head in the opposite direction and this movement continues until the cross-head returns to its operative position and is locked to the post 11 by the locking bolt A30 as previously described.

It will be recalled that this locking bolt operates automatically when the free end of the cross-head engages the post 11 and thus the cross-head cannot be moved outwardly again by the connecting rod C11.

Thus the cross-head prevents the further rotation of the crank pin C12 and vertical spindle C14, so that the friction clutch at the lower end of the latter is caused to slip until the clutch is subsequently disengaged in the manner already described.

The spindle C14 therefore makes one complete revolution only during each actuation thereof.

*Ejection of moulded articles and associated protective mechanism*

The mould shown in the drawings and comprising the upper and lower members 14 and 13 respectively, may be constructed for the manufacture of a single article only or for the simultaneous manufacture of a plurality of separate articles according to requirements and the size of the article itself. In the illustrated embodiment four separate articles are formed simultaneously and these are ejected from the upper male mould member 14 while the cross-head remains stationary at the full extent of its outward movement as previously explained, and as shown in Figure 5.

The nature of the ejecting mechanism depends upon whether the mouldings may be discharged by push-out ejector pins or whether they contain screw-threaded portions which require relative rotation between the mouldings and elements of the mould 14 in order to disengage the former.

If, for example, each portion of the male mould embodies one or more vertical screw-threaded pins which form correspondingly screw-threaded holes in the mouldings, the several pins are connected by gearing (not shown) to a vertical spindle D10 (Figure 2) mounted centrally in the cross-head 17. This spindle is provided at its upper end with a pulley which is connected by an endless belt D11 to an electric motor D12 which also is carried by the cross-head.

This motor is controlled by a tumbler switch D13 (Figures 14 and 15) secured to a fixed support adjacent to the vertical spindle C14. The spindle is fitted with a cam D14 which is engaged by a roller on one arm of a rocker lever D15, while the opposite arm thereof is fitted with a depending pin D16 arranged to coact with the forked free end of the tumbler of the switch D13.

The cam D14 is shaped and arranged so as to close and subsequently to open the switch while the cross-head remains stationary at the limit of its forward movement, whereby the motor D12 is operated for the period of time required for the unscrewing of the mouldings, which then drop freely from the mould 14.

In order to ensure that the mould will not be damaged during a subsequent moulding operation if all of the moulding are not ejected, the mouldings when ejected are received within corresponding cylindrical cups D17 which are open at their lower ends but which lower ends are covered at this time by a circular supporting plate D18 (Figures 2, 3, 4, 5, 16 and 18). Thus the articles when ejected are temporarily supported on the plate D18, each within its respective cup D17.

The several cups D17 are secured together and are carried on the outer end of a horizontal arm D19 which is pivotally mounted on a fixed vertical spindle D20 and is provided with an extension carrying a roller which engages the edge of a corresponding cam D21 on the vertical spindle C14 (Figure 16).

Similarly, the supporting plate D18 is secured to the outer end of an arm D22 pivoted on the same fixed spindle D20 and provided with an extension carrying a roller which engages a further cam D23 on the spindle C14.

When the cross-head 17 is disposed in its normal operative position, the cups D17 are arranged above the supporting plate D18 in the position shown in Figure 4 and at this time the mouldings produced during the preceding cycle are supported on the said plate within the respective cups.

When, however, the platen 10 is retracted to its lowermost position and the vertical spindle C14 is in consequence operated and the cross-head commences to swing forwardly as previously explained, the supporting plate D18 and cups D17 are successively moved in the opposite direction by the respective cams on the spindle C14— whereby when the three movements are completed the cups and the supporting plate are disposed below the upper mould 14 on the fully open cross-head.

As, however, the supporting plate D18 moves inwardly in advance of the cups D17, the latter sweep the moulded articles M therein from the said plate whereby they fall freely onto a discharge chute D24. Figure 5 shows this stage of the operation with the supporting plate D18 already in register with the mould 14 and the cups D17 about to move inwardly into register therebetween.

Finally after the further moulded articles are ejected into the cups D17 and as the cross-head is returning to its inner operative position, the plate D18 and cups D17 are moved outwardly in unison to the original position shown in Figure 4, so that the moulded articles remain supported on the plate D18 until the completion of the next cycle of operations.

Immediately after the plate D18 and associated cups D17 are returned as described to the position shown in Figure 4, each of the moulded articles M supported on the said plate is engaged by the lower end of a corresponding one of a plurality of elongated vertical detector members generally designated D25 (Figures 2, 3, 4, 5 and 18).

These detector members are supported by a common horizontal plate D26 which is secured centrally to the lower end of a sleeve D27 slidably mounted on a fixed guide rod which depends from a suitable bracket. The sleeve is provided intermediate its ends with a collar D28 which rests on the top of an inverted U shaped lifting member D29 having the lower ends of its arms pivoted to the forked outer end of a substantially horizontal lever D30 pivoted intermediate its ends to the frame of the machine by a pin D31.

A locating pin D42 secured to the collar D28 extends through a hole in the lifting member D29 and so prevents angular movements of the plate D26.

The opposite and rear end of the lever D30 is fitted with a roller to coact with a further cam D32 (Figure 3) secured to the vertical spindle C14. This cam is shaped so as to raise the detectors D25 shortly after the spindle C14 commences each rotation and before the cups D17 are moved inwardly to the article receiving position and to lower the said detectors whereby their lower ends re-enter the cups immediately the latter return to their normal outward positions, it being evident therefore that this downward movement of the detectors takes place during the final stage of each complete revolution of the spindle C14.

As shown in Figure 18, each detector D25 comprises a tubular casing D34 provided internally and adjacent its upper end with an electrical contact D35. A collar D36 secured to the casing rests on the top of the common supporting plate D26 and this collar is adjustable lengthwise of the casing so that the height of the lower end of the latter above the plate D18 may be adjusted to suit the height of the moulded articles M and it will be noted that the plate D26 is provided with a plurality of depending guide tubes D37 one for each detector.

The tubular casing D34 of each detector accommodates a tubular slide D38 comprising a metal tube which is closed at its lower end by a plug D39 and the upper end of which supports a contact D40 arranged in register with the contact D35 carried by the casing. The downward movement of slide D38 within the casing is limited by a stop member D41 which projects laterally from the top of the slide and through an opening in the wall of the respective casing D34.

Thus as the group of detectors is being raised in the manner previously described, each slide D38 moves downwards within its respective casing D34 to the full extent permitted by the stop members D41 at which time the contacts D35 and D40 are separated as shown in Figure 18. When, however, the detectors are subsequently being lowered simultaneously into the respective cups D17, the movement of each slide D38 is arrested when it engages the respective moulding M so that during the succeeding final stage of the downward movement of the respective detector casing, the contacts D35 and D40 are closed. If, however, any of the moulded articles has not been ejected from the male mould 14, the corresponding cup D17 is empty, in which case the contacts D35 and D40 of the respective detector remain open as shown in Figure 18, when the downward movement of the detectors is completed.

The contacts D35 and D40 of the several detectors are connected in series with each other and with a relay D44 disposed adjacent to the gate plate A15 and shown in Figures 2, 6 and 7.

This relay serves to operate a bell crank interlock lever D45, the vertical arm of which is provided with a forward extension D46 which is arranged to project above the gate plate when the latter is disposed in its lower position and so prevent its upward movement.

When the relay D44 is de-energised, due to the simultaneous upward movement of the detectors as above described, the weight of the interlock lever D45 causes it to swing forwardly so that the lug D46 passes above and locks the gate plate in its lower position, it being understood from the preceding description that the gate plate is necessarily in its lower position at this time.

Consequently, the gate plate cannot be moved upwardly to commence the next moulding cycle until the relay D44 is energized to release the interlock lever and for this purpose it is necessary for the contacts of all of the detectors D25 to be simultaneously closed. If, therefore, through faulty operation, one or more of the mouldings is not ejected from upper mould 14, the machine cannot continue to operate so that the risk of damaging the moulds in this way is avoided.

It is to be noted that the plunger B11 of the dashpot continues to fall under these circumstances and so after the lapse of a predetermined time interval, the limit switch B28 is opened to shut down the machine.

*Charging mechanism for mould*

A measured charge of moulding powder is delivered into each cavity in the lower mould 13, while the cross-head is disposed in its forward article ejecting position shown in Figure 5.

For this purpose a charging unit of vertical cylindrical form and generally designated E10 is secured to the outer end of a short arm E11 which is pivotally mounted on the post 11 above the free end of the cross-head 17. See Figures 2, 3, 4, 5 and 19 to 24 inclusive. Consequently, the charging unit may swing forwardly from its normal inoperative position shown in Figure 4 to its operative position shown in Figure 5, in which it is disposed above and in register with the lower mould 13. This bodily movement of the charging device is effected by means of a pivoted link E12 which connects the cross-head to an upward extension of the pivoted arm E11 so that the charging unit is constrained to move forwardly and rearwardly in unison with the cross-head.

Referring now to Figures 19 to 24 inclusive, the charging device comprises a horizontal bottom plate E15 which is secured rigidly to the supporting arm E11 and provided with four spaced discharge apertures E16, each of which registers with the respective mould cavity when the charging device is in register with the mould, it being understood that the number, size and spacing of the said apertures must conform with the particular mould for the time being in use.

An adjustable measuring unit comprising spaced upper and lower discs E17 and E18 respectively is supported on the upper face of the bottom plate E15 and is movable angularly on the latter about the central vertical axis thereof. This measuring unit is formed with four spaced measuring compartments E19 for the moulding powder, such compartments being normally disposed out of register with the discharge apertures E16 in the bottom plate. When, however, the charging device is arranged in register with the mould 13, the measuring unit is moved angularly as hereafter described to cause each of the measuring compartments to register with and discharge its contents through the respective aperture E16 in the bottom plate and thence into the respective mould cavity.

Each of the measuring compartments E19 is formed partly by a corresponding downward tubular extension E20 on the upper disc E17 of the measuring unit and partly by a sleeve E21 of rubber or the like arranged vertically within a corresponding housing formed integrally with the lower disc E18 and the upper portion of which slidably receives the lower end portion of the respective tubular extension E20.

Thus the volume of the several compartments E19 may be simultaneously varied by moving the upper disc E17 towards or from the lower disc as hereafter described, while small adjustments of the volumes of the several compartments may be effected independently by means of adjusting screws E24 which are operable to press inwardly the adjacent portions of the walls of the rubber sleeves E21 as shown at the right of Figure 20.

The movement of the upper disc E17 towards and from the lower disc E18 is effected by means of the engagement between an axial sleeve E25 secured to the upper disc and a sleeve E26 arranged therein and rotatively connected to the lower disc, the last mentioned sleeve being screw-threaded externally to engage a screw-threaded hole in the sleeve E25. The inner sleeve is movable angularly by means of a saw-cut formed in a head on the lower end of a centrally disposed connecting pin E27 which extends through the inner sleeve E26 and projects from the upper end thereof, the said head having a non-rotatable engagement with the adjacent lower end of the sleeve E26.

Thus when the central pin E27 is turned, the inner sleeve E26 is constrained to turn therewith whereby the upper disc E17 is raised or lowered.

A cylindrical powder barrel E28 is seated on top of the upper disc E17 of the measuring unit and is movable angularly thereon about the sleeve E25 whereby a plurality of discharge openings E29 in the bottom of the barrel may be moved into and out of register with the respective measuring compartments E19.

The powder barrel and measuring unit are resiliently pressed downwardly against the bottom plate E15 by a compression spring E30 which bears at its upper end against a collar E31 on the upper end of the connecting pin E27 and at its lower end against a bell E32 which encloses the upper end of the sleeve E25 and seats on the bottom of the barrel. Alternatively, the weight of the superimposed parts may be relied on alone to maintain mutual contact while permitting of relative axial movements to clear any powder or the like which may lodge therebetween.

A spider E33 supported on the top of the barrel E28 is provided in its periphery with ratchet teeth E34 and is fitted with a plurality of agitating fingers E35 which depend within the barrel so that when the spider is moved angularly and relatively to the barrel as hereafter described, the powder within the barrel is agitated unidirectionally which has been found to be important.

The powder is delivered to the barrel E28 through a chute E36 which projects into the upper end of a vertically adjustable sleeve E37 carried by the spider E33 and the height of which determines the level of the powder within the barrel in the manner of a chicken feeder.

The chute is bent and its upper end is funnel-shaped and located directly above the post 11 of the machine and around the discharge outlet of a storage hopper E38. Thus the hopper communicates freely with the chute and the powder barrel E28 irrespective of the angular position of the latter.

When the charging device occupies its normal retracted position as shown in Figure 4, the ratchet teeth E34 of the spider are engaged by a spring-loaded resilient retaining arm E39 so that as said charging device commences to move forwardly towards its operative position, an anti-clockwise movement is imparted to the spider and the powder is agitated by the fingers E35. However, the retaining arm is capable of only a limited inward movement, so that during the further inward movement of the charging device towards the mould, the ratchet is withdrawn from engagement with the retaining arm.

As the charging device closely approaches the limit of its inward movement, a striker E42 which projects outwardly from the barrel E28 engages the vertical post 12 on which the cross-head is pivoted, so that during the succeeding final stage of the said inward movement, an anti-clockwise movement (as viewed in Figure 5) is imparted to the barrel and to the spider E33 supported thereby.

This anti-clockwise movement of the barrel moves the discharge openings in the bottom thereof, out of register with the respective measuring compartments E19, the upper ends of the latter being thus closed as shown diagrammatically in Figure 22.

This reverse or anti-clockwise movement of the barrel also causes a cam E43 on the side of the barrel to engage a release pin E44 on a spring-loaded pawl E45 which is pivoted to the arm E11 which carries the bottom plate of the charging device thereby withdrawing the free end of the pawl from a notch E46 formed in the periphery of the upper discs E17 of the measuring unit. This pawl therefore normally serves to lock the measuring unit to the bottom plate in the relative positions previously described but when it is released, the measuring unit is free to turn on the bottom plate and permit the measuring compartments E19 to be moved subsequently into register with the respective discharge apertures E16 in the latter.

Consequently, when the charging device completes its inward movement and is in register with the mould 13, the measuring compartments E19 are closed at both their upper and lower ends and the discharge apertures E16 in the bottom plate E15 are in register with and are just clear of the upper ends of the respective cavities in the mould, At this stage an anti-clockwise movement is imparted to the measuring unit so as to move the compartments E19 into register with the apertures E16 whereby the measured charges of powder pass from the compartments into the mould cavities, as shown in Figure 23.

This angular movement is imparted to the measuring unit by means of a cable E48 which is wrapped around the lower disc E18 of the measuring unit and one end of which is connected to the adjacent end of a tension spring E49 which has its opposite end anchored to a bracket E50 secured to the arm E11. This cable extends slidably through a flexible sheath E51 and has its opposite end secured to one arm of a bell crank lever E52 pivoted to the aforesaid vertical spindle D20 disposed adjacent to the one-revolution vertical spindle C14. (See Figures 14 and 15.)

The opposite arm of the bell crank is fitted with a roller to coact with a cam E53 on the spindle C14, such cam being so shaped and located as to pull the cable E48 at the appropriate time, so as to impart the described anti-clockwise movement to the measuring unit, while shortly thereafter the said cable is released by the cam whereby the spring E49 at the opposite end of the cable returns the measuring unit to its original position by imparting a clockwise movement thereto. The movement imparted to the cable by the cam E53 is adjustable by means of an adjustable stop device comprising an eye bolt E54 pivoted to the bell crank E52 and extending slidably through a fixed bracket E55, this bolt being fitted with a wing nut. Figures 14 and 15.

It is to be noted that the barrel E28 and spider E33 participate in the aforesaid successive anti-clockwise and clockwise movements of the measuring unit so that the relative angular pushers of these parts remain unchanged, during such movements.

As the cross-head 17 commences to return inwardly to its moulding or operative position, the connecting link E12 moves the charging device outwardly in unison therewith but shortly prior to the completion of this outward movement, a tie rod E56 becomes effective to arrest the movement of the barrel E28 so that during the final stage of the return movement of the charging device, a clockwise movement is imparted to the barrel to bring the discharge openings E29 therein back into register with the respective measuring compartments E19, as shown in Figure 24.

This same angular movement of the barrel disengages the release pin E44 on the spring-loaded pawl E45 which thus re-engages the notch E46 in the disc E17 to lock the measuring unit to the bottom plate E15, the whole charging device being thus restored to its original condition as the cross-head 17 completes its inward movement.

The aforesaid tie rod E56 is pivotally connected at one end to the outer end of the aforesaid striker arm E42 on the barrel while its opposite end portion extends slidably through a bracket E57 and is fitted with an adjustable stop E58 to engage the latter and so arrest the return movement of the striker arm at the appropriate position. Figures 4 and 5.

While the illustrated charging mechanism has been devised for filling the mould cavities with free flowing moulding powder, it will be clear that it could readily be adapted to feed moulding material in the form of pellets.

General description of operation

With the machine operating and the mould, completely closed, as shown in Figures 2, 3 and 6, the plunger B11 of the timing device, which was previously carried upwardly by the platen 10 and was subsequently released, is descending together with the parts connected thereto, at the speed determined by the setting of the timing valve B14 but all other operative parts of the machine are stationary at this time.

During its descent the depending rod B22 engages and depresses the rear end of the rocker arm B23 thus withdrawing the retaining arm B25 from engagement with the raised gate plate A15 in preparation for the subsequent movement of the main valve A10. As, however, the coacting slider A21 is not operating, the retraction of the retaining arm B25 is without further effect at this time.

Shortly after the said retaining arm has been retracted the switch operating bar B26 of the timing device engages and closes the switch B27 to start the main motor 25.

The spindle 22 is thus rotated whereby the slider A21 is operated by the connecting rod A22. Consequently, when the slider reaches the inner end of its stroke, the gate plate descends until the slider is located in the upper slot A16 of the gate plate with the result that during the next outward stroke of the slider, the gate plate and valve operating arm A13 are moved in unison therewith to shut off the main supply pipe A12 and simultaneously connect the main ram cylinder 15 to the return pipe A13. See Figure 7.

Consequently, the ram 16 and lower mould member 13 commence their downward stroke under the influence of the drawback ram.

As the platen 10 carrying the mould member 13 approaches the lower end of its stroke, it actuates the rocker lever A43 to disengage the operative locking bolt A31 thereby releasing the free end of the cross-head 17 from the post 11 in preparation for the outward movement of the former to discharge the moulded articles.

Shortly thereafter the descending cross-head engages and operates the clutch actuating lever C22 to engage the clutch whereby the vertical one-revolution spindle C14 is caused to rotate at a relatively low speed.

During the initial stage of the revolution of the spindle, the cross-head is swung outwardly to the ejecting position as shown in Figure 5 while the charging device E10 simultaneously swings inwardly into register with the lower mould 13, and the cross-head and the charging device then remain stationary in the described positions while the crank pin C12 is passing from C1 to C2. Figure 5.

Also while the cross-head is moving outwards, the detectors D25 are raised vertically from the cups 17 of the article detecting mechanism after which the supporting plate 18 and the said cups swing inwardly in succession so as to register, with the upper mould 14 at the ejection position, these movements being produced by suitable cams on the spindle C14.

The lifting of the detectors D25 opens the circuit of the relay D44 which thus releases the interlock bell crank D45 so that the latter is displaced to cause the lug D46 to project above the gate plate A15 and so prevent the upward movement thereof.

The inward movement of the supporting plate in advance of the cups D17 causes the moulded articles previously supported on the plate to be swept therefrom by the cups whereby the said articles fall onto the chute D24 and are discharged from the machine.

The continued movement of the vertical spindle C14 effects the temporary closure of the switch D13, whereby the ejector motor D12 is operated to cause the moulded articles to be discharged from the mould 14, each into its respective cup D17, such cups at this time being closed at their lower ends by the common supporting plate D18.

Also while the moulded articles are being ejected from the mould 14, an angular movement is imparted by means of a cam on the spindle C14 so the measuring unit of the charging device then in register with the lower mould 13. This angular movement brings the powder filled compartments E19 of the measuring unit into register with the discharge apertures in the base plate of the charging device, so that the measured charges of powder pass into the respective mould cavities, the said measuring unit being then restored to its previous angular position.

Shortly thereafter the crankpin C12 passes the position C2, at which time the cross-head commences its return movement towards the moulding position and the charging device is moved outwardly in unison therewith.

While the cross-head is undergoing its return movement the detector members D25 are lowered into the cups D17 containing the ejected moulded articles, with the result that the switch embodied in each of the detectors is closed if all of the articles have been ejected. As previously explained, these switches are connected in series with each other and with the relay D44 of the interlock bell crank D45 which therefore is operated to withdraw the lug D46 from the upper edge of the gate plate A15.

As the cross-head completes its inward movement and engages the vertical post 11, the locking bolt A30 carried by the cross-head passes from the ramp on the latching member 26 and descends behind the shoulder thereon at the same time depressing the push rod A28 so that the rocker arm A25 raises the gate plate A15. Thus the slider A21 which is still reciprocating due to the fact that the motor 25 is still running, passes from the upper slot A16 in the gate plate to the lower slot A17 therein. The gate plate is thus forced to the left during the next succeeding outward stroke of the slider, thereby placing the cylinder 15 of the main ram in communication with the oil supply pipe A12 and at the same time closing the communication between the ram cylinder and the return pipe A13, so that the platen 10, together with the mould 13, commences its upward movement.

As previously explained, the cross-head is locked to the post 11 by the bolt A30 immediately the cross-head reaches the moulding position, so that the cross-head cannot be moved outwardly again by the extensible connecting rod C11. Thus the locked cross-head prevents the continued rotation of the spindle C14 and the clutch at the lower end thereof commences to slip. The spindle C14 is therefore permitted to make one revolution only.

The platen in its upward movement also raises the plunger B11 of the timing dashpot, because at this time the pivoted hook B19 carried by the platen is engaged with the hook on the pivoted arm B16 connected to the plunger and during the initial stage of this upward movement, the switch operating bar B26 carried by the arm B16 engages switch B27 and moves it to the "off" position. This switch is in circuit with the main driving motor 25 which therefore shuts down so that the spindle 22 and the slider A21 in the gate plate cease to operate.

Also during the initial stage of the upward movement of the dashpot plunger, the rocking arm B23 associated with the gate plate A15 is released, so that the retaining arm B25 secured to the rocker arm moves into its operative position below the gate plate to prevent the descent of the latter.

The initial upward movement of the platen also releases the rocker lever A43 thereby permitting the push rod A42 to be forced downwardly by the second locking bolt A31 on the cross-head, so that at this stage the latter is locked to the post 11 by both locking bolts A30 and A31. However, as the platen closely approaches its uppermost or moulding position, the bell crank A37 thereon engages and raises the locking bolt A30, so as to disengage it from the latching member 26, such bolt when fully raised, being retained in its inoperative position by the retaining lever A48.

Also during the final stage of the upward movement of the platen, the pivoted hook B19 engages the adjustable stop B21 so as to release the pivoted arm B16 of the timing device, whereby the plunger B11 commences to descend at a rate determined by the timing valve B14 and thereby to measure the required time interval during which the mould remains closed, the cycle of operating being thus complete.

It is important to note that after the timing device operates the motor switch B27 during the descent of the plunger B11 so as to start up the motor 25, the said plunger B11 continues to descend until such downward movement is eventually arrested by the upward movement of the platen, after the intervening operations of ejecting the moulding and returning the cross-head have been completed. Thus the dashpot plunger B11 continues to descend throughout the time that the vertical spindle C14 is undergoing its complete rotation and for some little time thereafter.

If one or more of the moulded articles is not ejected from the upper mould 14, into the respective cup D17, the switch of the corresponding detector D25 remains open when the group of detectors is lowered through the medium of the corresponding cam on the spindle C14. In these circumstances the relay D44 is not operated to release the interlock bell crank D45 so that the gate plate A15 cannot be raised by the rocker arm A25 when the push rod A28 is depressed by the locking bolt A30 when the cross-head returns to the moulding position. This movement of the push rod A28 independently of the rocker arm A25 is permitted by the lost motion connection A27 therebetween. As the gate plate is not raised in these circumstances, the main valve A10 is not operated to cause the platen 10 to move upwardly, with the result that the plunger B11 of the timing device continues its downward movement, whereby it operates the limit switch B28 by moving it to its "off" position, thereby interrupting the circuit of the driving motor 25 and preferably disconnecting all of the electric equipment of the machine, including mould heaters from the power supply. The machine is therefore shut down until it is manually re-started after the non-ejected moulding is removed.

The application of the invention is not confined to a moulding press with a swing-out cross-head as previously described, as it is applicable also to presses of the type in which the two moulds remain in coaxial alignment at all times.

For example if it is assumed that the cross-head 11 of the machine previously described is fixed permanently in the moulding position, it will be evident that the pivoted charging device may be operated directly by the extensible connecting rod C11, at the upper end of the spindle C14, so that it is moved into position above the lower mould when the latter is fully retracted as previously described. In such a case the locking bolts A30 and A31 instead of being associated with the cross-head as previously described, may be similarly associated with the charging device, so as to lock the latter in its normal retracted position and in fact it will be apparent from the preceding description that these locking bolts perform that function in the case of the illustrated machine, for the reason that the charging device is tied to the cross-head by the connecting link E12.

It will similarly be evident that when the cross-head is fixed in position as previously mentioned, the receiving cups D17 and associated supporting plate D18 for the ejected moulded articles may be moved into position below the upper mould to receive the said articles, so that these elements of the machine operate in the manner previously described. It will, however, be apparent that in such circumstances, the said collecting device for the ejected articles when disposed in its operative position below the upper mould would, at that time, be located above the charging device then in register with the lower mould so that it would be necessary to provide sufficient space between the open mould members 13 and 14 for this purpose. Thus it would be necessary either to increase the stroke of the main ram 16 or alternatively to retract the upper mould member 14 also, by a further hydraulic ram.

I claim:

1. An automatic moulding machine comprising a frame, a platen movable substantially vertically on the frame and adapted to support a lower mould member, a hydraulic ram for reciprocating said platen, control means for said hydraulic ram, a cross-head arranged above said platen and adapted to support an upper mould member, said cross-head being restrained by the frame against vertical movements, means pivotally connecting said cross-head to the frame whereby it is movable angularly in a substantially horizontal plane to move said upper mould member from its moulding position to an article ejecting position, locking means operable to lock the cross-head in its moulding position, means operable by said platen as it approaches the lower end of its stroke to release said locking means, an intermittently operable timing device, means operable by the platen during each upward stroke thereof to start said timing device, means controlled by said timing device and operable at the expiration of a predetermined time interval measured thereby to operate said control means whereby the platen commences its downward stroke, means operable by said platen as it approaches the lower end of its stroke to cause the cross-head to swing outwardly to the ejecting position thereof and thence to return to its moulding position, a movable mould charging device embodying a measuring compartment, means operable when the platen is disposed at the lower end of its stroke to move said charging device from a normally retracted position above and into register with the lower mould member and then to return said charging device to its retracted position, means operable to actuate said charging device while in register with the lower mould member to deliver mouldable material to the lower mould, and means operable by said locking means upon the return of the cross-head to its moulding position, to actuate said control means to cause the platen to undergo an upward stroke.

2. An automatic moulding machine including a supporting plate for a moulded article ejected from a mould, a cup open at its upper and lower ends with its lower end normally covered by said supporting plate, means operable to move said supporting plate and said cup in succession from a normal position thereof to an article receiving position whereby an article previously supported on said plate is discharged therefrom during such movement, said means being operable to return the said plate and cup in unison to said normal position thereof after a further ejected article has been received within the cup, an article detector member supported above and arranged to register with the cup at the normal position of the latter, means operable to raise and lower said detector member out of and into the cup and a switch operable by said detector member upon engagement of the latter with an article within the cup, said switch being thus operable to permit of the moulding of a further article.

3. An automatic moulding machine according to claim 2 including a vertically adjustable support for said detector member and wherein the latter is disposed vertically and is slidable in said support whereby its movement may be arrested when its lower end engages the moulded article within the cup and before said vertically adjustable support reaches its lowermost position.

4. An automatic moulding machine comprising a pivoted cross-head adapted to support an upper mould member and to move same angularly in a horizontal plane from a moulding position to an article ejecting position, a stop for preventing movement of the crosshead beyond the said ejecting position, a vertically movable platen arranged below the cross-head and adapted to support a complementary lower mould member, a rotatable crank, a resiliently extensible rod connecting said crank to the cross-head, means operable when the lower platen is at the lower end of its stroke to rotate said crank through one revolution, thereby to move said cross-head from its moulding position to said ejecting position and thence back to the moulding position and characterised in that during a part of the revolution thereof the extensible connecting rod tends to move the cross-head beyond the said stop therefor whereby the rod is extended and the cross-head pauses at the said ejecting position for a predetermined period.

5. An automatic moulding machine according to claim 4 including a normally retracted mould charging device pivotally supported for angular movements in a horizontal plane and a pivoted link connecting the charging device to the cross-head whereby as the latter swings outwardly to and pauses at the ejecting position, the said charging device moves above and pauses in register with the lower mould member.

6. An automatic moulding machine comprising a frame, a crosshead pivotally mounted on the frame for movements about a substantially vertical axis whereby an upper mould member carried thereon is movable laterally from a normal position to an ejecting position thereof, a platen guided for vertical reciprocating movements below the normal position of the upper mould member, the said platen being adapted to support a complementary lower mould member, actuating means for the platen, control means for said actuating means, an intermittently operable timing device, means operable consequent upon the close approach of the platen to its uppermost position to start said timing device, means controlled by said timing device and operable upon the expiration of a time interval measured thereby, to actuate the said control means whereby the platen is retracted, ejecting means for the moulded articles, a normally retracted mould charging means movable into and out of register with the lower mould member, a one-revolution spindle, a crank on the spindle, a connection between the crank and the crosshead whereby during each revolution of the spindle the crosshead is moved from its normal position to the ejecting position and then back to the normal position, means connecting the crosshead and charging means whereby they are constrained to move in unison, means operable consequent upon the descent of the movable platen to actuate the said one-revolution spindle, means operable consequent upon the return of the pivoted crosshead to its normal position to actuate said control means whereby the said movable platen is again moved upwardly to close the mould, an angularly movable element in the charging means to effect the discharge of mouldable material therefrom and means actuated by said spindle for operating said last-mentioned means while the charging device is in register with the lower mould member.

7. An automatic moulding machine comprising an hydraulic ram operable to open and close a mould comprising upper and lower members, means supported for lateral movements from and to a normal position thereof, for the purpose of recharging the mould with mouldable material, means operable to cause the locking of said laterally movable means in the said normal position after each operation thereof, control means, responsive to the operation of the said locking means, to initiate a moulding cycle comprising a projecting stroke and a subsequent retracting stroke of the ram, means operable during each retracting stroke of the ram to release the said locking means, and means responsive to a further retracting movement of the ram to actuate the said laterally movable means whereby it is displaced from and is then returned to its said normal position.

8. An automatic moulding machine comprising an hydraulic ram operable to open and close a mould comprising upper and lower members, a mould charging device supported for lateral movements in opposite directions between a normal inoperative position and an operative position in which it registers with the lower member of the mould, operating means to cause the charging device to be locked in its normal position after each operation thereof, control means actuated by said lock operating means to initiate a moulding cycle of the ram as the said charging device is locked in its normal position, the said moulding cycle comprising a projecting stroke and a subsequent retracting stroke of the ram, means operable by the ram during an intermediate stage of each retracting stroke thereof to release the said locking means, driving means operable to move the charging device from and return it to the said normal position thereof and further control means operable by the ram at a later stage of each retracting stroke thereof to effect actuation of the said driving means.

9. An automatic moulding machine comprising upper and lower supports for corresponding members of a mould, a hydraulic ram operable to impart vertical movements to one at least of the supports thereby to open and close the mould, a laterally movable member carrying one of the said mould supports whereby the latter is movable from and to a normal position in which it is disposed in alignment with the other mould support, means operable automatically to lock the said laterally movable mould support in its normal position, after each operation thereof, control means operable by said locking means to initiate a moulding cycle of the ram when the laterally movable member returns to its normal position, the said moulding cycle comprising a projecting stroke and a subsequent retracting stroke of the ram, means operable by the ram at an intermediate stage of each retracting stroke thereof to release the locking means, a rotatable spindle operable to actuate the laterally movable mould support, a friction clutch for transmitting motion to the spindle, from a source of power and means operable by the ram at a later stage of each retracting stroke thereof to effect engagement of the friction clutch whereby the laterally movable mould support is moved laterally from and then returned to its normal position, the said friction clutch being similarly disengaged during an initial stage of each projecting stroke of the ram.

10. An automatic moulding machine comprising upper and lower supports for corresponding members of a mould, a hydraulic ram operable to impart vertical movements to one at least of the supports thereby to open and close the mould, a laterally movable crosshead carrying the upper mould support whereby the latter is movable from and to a normal position in which it is disposed in alignment with the lower mould support, a mould charging device movable laterally in unison with the crosshead so as to register with the lower mould member when the upper mould member is moved laterally out of alignment therewith and vice versa, means operable automatically to lock the crosshead in its normal position after each operation thereof, control means operable by said locking means to initiate a moulding cycle of the ram when the crosshead returns to its normal position, the said moulding cycle comprising a projecting stroke and a subsequent retracting stroke of the ram, means operable by the ram at an intermediate stage of each retracting stroke thereof to release the locking means to permit of lateral movements of the crosshead, a charging device, a spindle operable through one revolution to displace the crosshead and charging device laterally in unison from and to the normal positions thereof, a friction clutch for transmitting motion to the spindle from a source of power and means operable by the ram at a later stage of each retracting stroke thereof to effect engagement of the friction clutch whereby the crosshead and charging device are moved laterally from and are then returned to their normal positions, the last mentioned means being operable to disengage the clutch during an initial stage of each projecting stroke of the ram and the said clutch being adapted to slip so as to allow the said spindle to remain stationary when the crosshead returns to and is locked in its said normal position.

11. An automatic moulding machine comprising an hydraulic ram operable to open and close a mould comprising upper and lower members, a mould charging device supported for lateral movements in opposite directions between a normal inoperative position and an operative position in which latter it registers with the lower member of the mould, automatic operating means to cause the charging device to be locked in its normal position after each operation thereof, control means actuated by said lock operating means to initiate a projecting stroke of the ram as the said charging device is locked in its normal position, a reciprocable timing member, coupling means operable by the ram during each projecting stroke thereof to displace the timing member in one direction, means operable as the ram closely approaches the limit of its projecting stroke to disengage the said coupling means, the said timing member when thus released being movable at a predetermined speed in the opposite direction, means operable by the timing member when moving in the last-mentioned direction to initiate a retracting stroke of the ram, means operable by the ram during an intermediate stage of each retracting stroke thereof to release the said lock operating means for the charging device, driving means operable to move the charging device from and return it to the said normal position thereof and further control means operated by the ram at a later stage of each retracting stroke thereof to effect actuation of the said driving means.

12. An automatic moulding machine comprising an hydraulic ram operable to open and close a mould comprising upper and lower members, means supported for lateral movements from and to a normal position thereof for the purpose of recharging the mould with mouldable material, means operable to cause the locking of said laterally movable means in the normal position after each operation thereof, control means responsive to the operation of the said locking means to initiate a projecting stroke of the ram thereby to close the mould, timing means operable when the mould is closed to initiate a retracting stroke of the ram after a predetermined time interval, means operable by the ram during each retracting stroke thereof to release the said locking means for the laterally movable member, means responsive to a further retracting movement of the ram to actuate the said laterally movable member whereby it is displaced from and is then returned to its said normal position, means operable while the laterally movable means is displaced from its normal position to eject the moulded article from the upper mould member, means for temporarily supporting the moulded article, detector means operable before the ram commences its next succeeding stroke to move into engagement with the moulded article while the latter is thus temporarily supported and means operable to prevent a further actuation of the ram if the detector fails so to engage the moulded article.

13. An automatic moulding machine comprising a pivoted crosshead adapted to support an upper mould member and to move same angularly in a substantially horizontal plane from a moulding position to an article ejecting position, a vertically movable platen arranged below the crosshead and adapted to support a complementary lower mould member, means operable when said platen is retracted to move said crosshead from the moulding position thereof to the ejecting position and then to return it to said moulding position, a first locking member operable consequent upon the return of the crosshead to lock the latter in its moulding position, means responsive to the operation of said first locking member for causing the platen to undergo an upward stroke, a second locking means operable by said platen to lock said crosshead in its moulded position during the upward stroke of the platen and to release the crosshead during the downward stroke thereof, means operable by the platen during its upward stroke to release said first locking member and means operable to retain the last mentioned locking member in its released position until the crosshead completes its next succeeding angular movement.

14. An automatic moulding machine comprising an hydraulic ram operable to open and close a mould comprising upper and lower members, control means comprising a reciprocable gate member and a coacting reciprocable slider, said gate member being formed with two elongated slots disposed substantially parallel to each other and spaced both longitudinally and laterally so that their inner ends overlap and communicate, the said slider being operable in said slats alternatively, a ram reversing means movable in opposite directions to cause the ram to be operated in corresponding directions, means connecting said ram reversing means to one of the said reciprocable members whereby they are constrained to move in unison, means operable to reciprocate the other of said reciprocable means in the longitudinal direction of the said elongated slots, one of the said reciprocable members being movable laterally to transfer the slider from either of said elongated slots to the other, displaceable means supported for movements from and to a normal position thereof, for the purpose of recharging the mould with mouldable material, operating means to cause the locking of the displaceable means in said normal position after each operation thereof, means responsive to the operation of said locking means to effect lateral displacement of the aforesaid laterally movable reciprocable member thereby to initiate a moulding cycle of the ram, means operable while the mould is closed to cause the said laterally movable reciprocating member to move laterally to its original position thereby to initiate a mould opening movement of the ram, means operable during each mould opening movement of the ram to release the said locking means and means responsive to a further mould opening movement of the ram to actuate the said displaceable means, whereby said means is moved from and is then returned to and locked in said normal position.

References Cited in the file of this patent
UNITED STATES PATENTS

| 1,861,391 | Hall | May 31, 1932 |
| 2,256,081 | Farley | Sept. 16, 1941 |
| 2,347,971 | Sayre | May 2, 1944 |
| 2,349,916 | Stacy | May 30, 1944 |
| 2,391,362 | Strauss | Dec. 18, 1945 |
| 2,444,339 | Dinzl | June 29, 1948 |
| 2,582,891 | Strauss | Jan. 15, 1952 |